(12) United States Patent
Hanisch

(10) Patent No.: US 11,105,913 B2
(45) Date of Patent: Aug. 31, 2021

(54) ADAPTIVE PULSE TRAIN LAYOUT

(71) Applicant: Wärtsilä SAM Electronics GmbH, Hamburg (DE)

(72) Inventor: Kai Hanisch, Hamburg (DE)

(73) Assignee: WÄRTSILÄ SAM ELECTRONICS GMBH, Hamburg (DE)

(*) Notice: Subject to any disclaimer, the term of this patent is extended or adjusted under 35 U.S.C. 154(b) by 211 days.

(21) Appl. No.: 16/268,174

(22) Filed: Feb. 5, 2019

(65) Prior Publication Data

US 2019/0170868 A1    Jun. 6, 2019

Related U.S. Application Data

(63) Continuation of application No. PCT/EP2016/068786, filed on Aug. 5, 2016.

(51) Int. Cl.
*G01S 13/22* (2006.01)
*G01S 13/937* (2020.01)

(52) U.S. Cl.
CPC ............ *G01S 13/22* (2013.01); *G01S 13/937* (2020.01)

(58) Field of Classification Search
CPC ................................ G01S 13/22; G01S 13/937
USPC .......................................................... 342/88
See application file for complete search history.

(56) References Cited

U.S. PATENT DOCUMENTS

| | | | | |
|---|---|---|---|---|
| 2004/0004567 A1* | 1/2004 | Kroeger | .................. | G01S 13/22 342/109 |
| 2008/0100503 A1* | 5/2008 | Yanagi | .................. | G01S 13/937 342/176 |
| 2011/0187579 A1* | 8/2011 | Asada | .................. | G01S 15/108 342/27 |

(Continued)

FOREIGN PATENT DOCUMENTS

| | | | | |
|---|---|---|---|---|
| DE | 10255309 A1 * | 2/2004 | ............. | G01S 13/22 |
| DE | 10255309 A1 | 2/2004 | | |

(Continued)

OTHER PUBLICATIONS

English translation of specification for DE 102 55 309 A1 (Year: 2004).*

(Continued)

*Primary Examiner* — Frank J McGue
(74) *Attorney, Agent, or Firm* — Buchanan Ingersoll & Rooney PC

(57) ABSTRACT

A RADAR control apparatus includes a range identifier configured to identify a scan range that is a radial distance from the range identifier, and a control unit configured to receive the scan range and cause a RADAR pulse generation unit to emit a RADAR pulse train that is a pattern of RADAR pulse waves including: a type of RADAR pulse wave; a number of each type of RADAR pulse wave; a RADAR pulse wave duration or RADAR pulse wave width; a RADAR pulse wave amplitude; a temporal spacing between each RADAR pulse wave; a sequential order for the (Continued)

type and the number of RADAR pulse waves; and/or at least one sector of space surrounding the RADAR pulse generation unit through which the RADAR pulse waves will propagate. The control unit is configured to continuously adapt the pattern of RADAR pulses in accordance with the received scan range.

21 Claims, 9 Drawing Sheets

(56) References Cited

U.S. PATENT DOCUMENTS

2015/0323659 A1* 11/2015 Mitchell ............... H01Q 21/20
    342/41
2016/0054437 A1* 2/2016 Lilburn ..................... G01S 7/28
    342/21

FOREIGN PATENT DOCUMENTS

EP      1839071 B1 *  5/2014   ............ G01S 7/28
EP      1839071 B1    5/2014

OTHER PUBLICATIONS

International Search Report and Written Opinion issued in corresponding International Patent Application No. PCT/EP2016/068786, 12 pages (dated Apr. 4, 2017).

* cited by examiner

| Master Range Setting | Slave Range Setting | | | | | | | | |
|---|---|---|---|---|---|---|---|---|---|
| | 0.25NM | 0.5NM | 0.75NM | 1.5NM | 3NM | 6NM | 12NM | 24NM | 48NM |
| 0.25NM | Short | Short | Short | Short Medium | Short Medium | Short Medium | Short Medium Long | Short Medium Long | Short Medium Long |
| 0.5NM | Short | Short | Short | Short Medium | Short Medium | Short Medium | Short Medium Long | Short Medium Long | Short Medium Long |
| 0.75NM | Short | Short | Short | Short Medium | Short Medium | Short Medium | Short Medium Long | Short Medium Long | Short Medium Long |
| 1.5NM | Short Medium | Short Medium | Short Medium | Short Medium | Short Medium | Short Medium | Short Medium Long | Short Medium Long | Short Medium Long |
| 3NM | Short Medium | Short Medium | Short Medium | Short Medium | Short Medium | Short Medium | Short Medium Long | Short Medium Long | Short Medium Long |
| 6NM | Short Medium | Short Medium | Short Medium | Short Medium | Short Medium | Short Medium | Short Medium Long | Short Medium Long | Short Medium Long |
| 12NM | Short Medium Long | Short Medium Long | Short Medium Long | Short Medium Long | Short Medium Long | Short Medium Long | Short Medium Long | Short Medium Long | Short Medium Long |
| 24NM | Short Medium Long | Short Medium Long | Short Medium Long | Short Medium Long | Short Medium Long | Short Medium Long | Short Medium Long | Short Medium Long | Short Medium Long |
| 48NM | Short Medium Long | Short Medium Long | Short Medium Long | Short Medium Long | Short Medium Long | Short Medium Long | Short Medium Long | Short Medium Long | Short Medium Long |

FIG. 6

ADAPTIVE PULSE TRAIN LAYOUT

CROSS-REFERENCE TO RELATED APPLICATIONS

This application claims priority as a continuation application under 35 U.S.C. § 120 to PCT/EP2016/068786 filed as an International Application on Aug. 5, 2016 designating the U.S., the entire content of which is hereby incorporated by reference in its entirety.

FIELD

The disclosure relates to a control apparatus for a RADAR system, such as a marine RADAR system. More particularly, the disclosure relates to a control apparatus configured to cause the RADAR system to generate an adaptive pulse train layout.

BACKGROUND INFORMATION

Magnetron based pulse RADAR systems can employ a pulse layout that includes a single pulse to cover the instrumented range selected by the user. Due to the high peak output power, repeated pulses are short enough to have an acceptable blind sector (e.g., a distance range where a target cannot be detected due to its reflected signal because the RADAR system is still emitting the pulse). At the same time, the pulses are powerful enough to cover the range desired, even for off-centered PPI view and ARPA tracking. The RADAR includes a wavelength range between 3 MHz and 110 GHz, wherein a known RADAR system adopts only a sub-range of this wavelength range. Solid State RADAR systems employ significantly longer (as in longer pulse duration or longer pulse width) pulses (up to 100 times longer) to achieve the same energy on target, as the peak output power is lower by essentially the same amount. This, in turn, leads to a blind sector that obscures a large area in the view and is not acceptable to the user.

Known systems employ a pulse train. In the pulse train, a frame or group of pulses that is the same regardless of the speed of rotation of the antenna or the range setting of the apparatus are produced and repeated continuously. The pulse train can include three pulses A, B and C, for example. The pulses A, B and C have the same amplitude but have different widths (lengths) and different spacings (intervals) to the next pulse. The information of all the echo returns of all pulses is then digitally stored and computed to build a single range sweep. This composed sweep then contains echo returns out to far away ranges without suffering from the large blind sector, because the short range information is added from the echo returns of a shorter pulse.

A pulse train with 3 pulses, one unmodulated (CW) pulse at around 100 ns and 2 modulated pulses with up to 33 µs of length are sufficient to cover all requirements of a modern marine RADAR. The continuous repeating of the exact pulse train consisting of three pulses (A, B, C) of different widths has been patented by Kelvin Hughes (European Patent EP 1 839 071 B1). The independent claim of the granted patent is as follows:

"A marine radar apparatus comprising means for generating Doppler information (24) to enable targets of different speeds to be identified the apparatus being arranged to propagate continuously repeating groups of pulses of energy towards targets and to receive groups of pulses of energy reflected back by the targets, in which each group of pulses includes three pulses (A, B, C) of different widths in which there is a spacing between each of the pulses, the shorter pulse (A) enabling detection of close range targets and the longer pulses (B, C) enabling detection of longer range targets wherein the different length pulses are encoded differently from one another."

The system developed by Kelvin Hughes employs a transmission of 3 pulses for standard operation. There is one (unmodulated) CW pulse with a length of about 100 ns, and two frequency modulated pulses for medium and long range detection. The different modulations aim at facilitating the detection of the echo returns. There are two different transmission frames with different pulse lengths and sample times for the modulated pulses, which in turn leads to 2 different PRIs for the system.

A simplified overview of the RF power over time in this known system is shown in FIG. 1. The time axis is not to scale. In the top part, the time sequence for an instrumented range of 48 NM is shown; and in the bottom part, the time sequence for an instrumented range of 24 NM is shown. The emission of the short, medium and long pulses in a transmission frame starting with the short pulse is the same for both instrumented ranges, but the pulse repetition interval varies between the 24 NM and 48 NM operating modes, as the sample time is shorter for the long range pulse in 24 NM mode. This is the main limitation for the overall pulse train PRF.

The RADAR system operating according to this pulse scheme would always be emitting pulses according to the 24 NM transmission frame, unless the instrumented range would be larger than 24 NM. In that case, the 48 NM transmission frame would be used.

FIG. 2 shows a range coverage diagram for this 3-pulse transmission frame, in the 24 NM operating mode. In a range coverage diagram, the pulse train generation unit (e.g. on a ship) is shown in the center of concentric circles showing the different coverage ranges around the pulse train generation unit, which are marked by different hatching. The range axis is given as an example and is not necessarily to scale. As may be seen in FIG. 2, by the short pulse, the range up to 1 NM is covered (except for a small blind sector, not shown). By the medium pulse, the range between 1 NM and 6 NM is covered; and by the long pulse, the range between 6 NM and 24 NM is covered.

SUMMARY

Embodiments of an exemplary RADAR control apparatus can include a range identifier configured to identify a scan range, the scan range being a radial distance from the range identifier; and a control unit configured to receive the scan range from the range identifier and cause a RADAR pulse generation unit to emit a RADAR pulse train that will be a pattern of RADAR pulse waves. The pattern of RADAR pulse waves can include a type of RADAR pulse wave and a temporal spacing between each RADAR pulse wave. The control unit can be configured to continuously adapt the pattern of RADAR pulses by adjusting the type of RADAR pulse wave and the temporal spacing between each RADAR pulse wave in accordance with the received scan range.

Embodiments of an exemplary RADAR system can include a RADAR pulse generation unit configured to emit RADAR pulse waves. The RADAR system can include a range identifier configured to identify a scan range for the RADAR pulse generation unit, the scan range being a radial distance from the RADAR pulse generation unit. The RADAR system can include a control unit configured to receive the scan range from the range identifier and cause the RADAR pulse generation unit to emit a RADAR pulse train that will be a pattern of RADAR pulse waves. The pattern of RADAR pulse waves can include a combination of: a type of RADAR pulse wave; a number of each type of RADAR pulse wave; a RADAR pulse wave duration or RADAR pulse wave width; a RADAR pulse wave amplitude; a temporal spacing between each RADAR pulse wave; a sequential order for the type and the number of RADAR pulse waves; or at least one sector of space surrounding the RADAR system through which the RADAR pulse waves will propagate. The type of RADAR pulse wave can include any one or combination of a short RADAR pulse wave width, a short RADAR pulse wave temporal spacing, a medium RADAR pulse wave width, a medium RADAR pulse wave temporal spacing, a long RADAR pulse wave width, or a long RADAR pulse wave temporal spacing. The control unit can be configured to continuously adapt the pattern of RADAR pulses in accordance with the received scan range.

An exemplary method for generating RADAR pulse waves can involve: identifying a scan range within a 360 degree perimeter, and generating a RADAR pulse train that will be a pattern of RADAR pulse waves. The pattern of RADAR pulse waves can include a type of RADAR pulse wave and a temporal spacing between each RADAR pulse wave. The method can involve continuously adapting the pattern of RADAR pulses by adjusting the type of RADAR pulse wave and the temporal spacing between each RADAR pulse wave in accordance with the received scan range.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein:

FIG. 6 shows different pulse train layouts for differently instrumented master MFD/slave MFD according to an exemplary embodiment of a disclosed apparatus;

DETAILED DESCRIPTION

Figure 1:
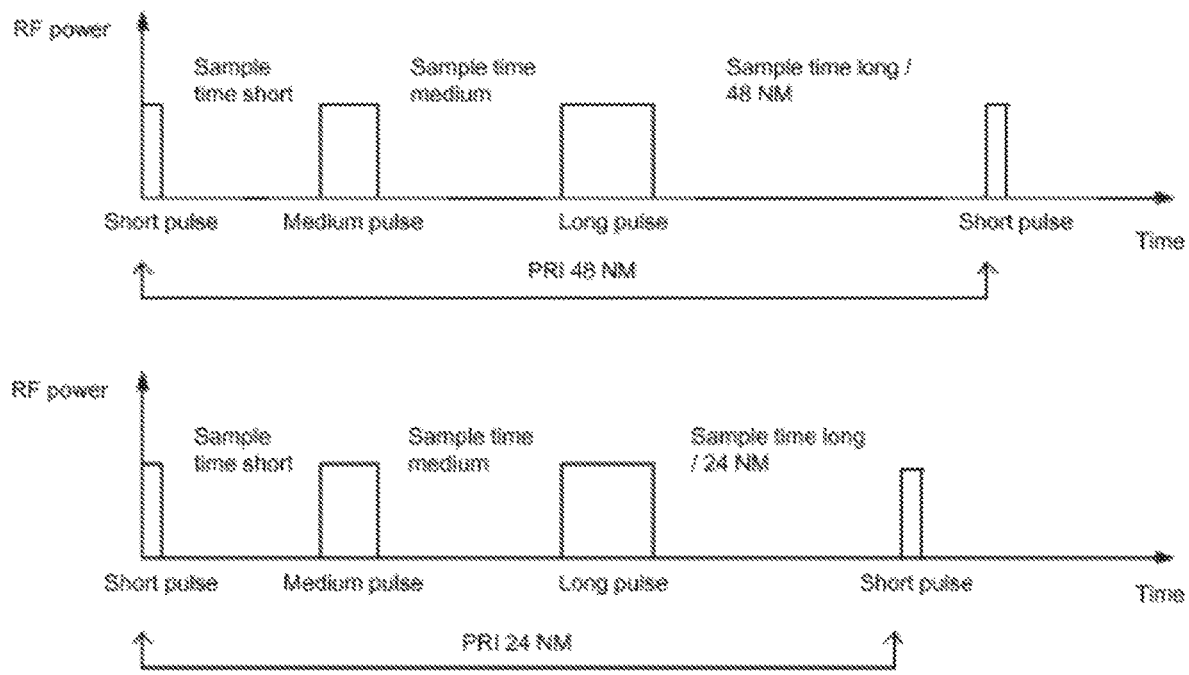
FIG. 1 shows known transmission frames.

Certain exemplary embodiments will be described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting to those particular examples.

Moreover, it is to be understood that an exemplary apparatus is configured to perform the corresponding method, although in some cases only the apparatus or only the method are described.

Abbreviations

RF Radio Frequency
PPI Plan Position Indicator
ARPA Automatic RADAR Plotting Aid
CW Continuous Wave
PRF Pulse Repetition Frequency
PM Pulse Repetition Interval
MFD Multi-Functional Display
SNR Signal to Noise Ratio
NM Nautical Mile (1 NM=1852 meters)
IEC International Electrotechnical Commission According to a first aspect of the disclosure, there is provided an apparatus, including a range identifier configured to identify a desired range, wherein the desired range is to be scanned by RADAR pulses of a pulse train; a control unit configured to control a pulse train generation unit to generate the pulse train such that the pulse train includes plural RADAR pulses;

respective spacings are provided between the RADAR pulses of the pulse train; wherein the control unit is configured to adapt continuously at least one of a type, a number, and an order of the plural RADAR pulses and the spacings between the RADAR pulses generated by the pulse train generation unit according to the desired range.

The apparatus may include a first deciding unit configured to decide if the desired range extends beyond a first predetermined distance; wherein the control unit may be configured to control the pulse train generation unit to generate the pulse train such that the pulses of the pulse train are emitted in transmission frames;

each transmission frame includes one or more of the RADAR pulses and respective spacings;

if the desired range extends beyond the first predetermined distance the pulse train includes a first longer transmission frame including a first longer RADAR pulse (B), if the desired range does not extend beyond the first predetermined distance the pulse train includes a shorter transmission frame including a shorter RADAR pulse and not including the first longer RADAR pulse;

the shorter RADAR pulse is shorter than the first longer RADAR pulse;

a first spacing between the shorter RADAR pulse and a respective subsequent RADAR pulse of the pulse train is shorter than a first longer spacing between the first longer RADAR pulse and a respective subsequent RADAR pulse of the pulse train.

The control unit may be configured to control the pulse train generation unit such that the longer transmission frame additionally includes the shorter RADAR pulse.

The control unit may be configured to control the pulse train generation unit such that the longer transmission frame does not include the shorter RADAR pulse.

The apparatus may include a second deciding unit configured to decide if the desired range extends beyond a second predetermined distance; wherein the control unit may be configured to control the pulse train generation unit to generate the pulse train such that the pulses of the pulse train are emitted in transmission frames;
each transmission frame includes one or more of the RADAR pulses and respective spacings;
if the desired range does not extend beyond the second predetermined distance, the pulse train includes a transmission frame including a first RADAR pulse with a first spacing between the first RADAR pulse and the RADAR pulse of the pulse train subsequent to the first RADAR pulse;
if the desired range extends beyond the first predetermined distance, the pulse train includes a transmission frame including the first RADAR pulse with a second spacing between the first RADAR pulse and the RADAR pulse of the pulse train subsequent to the first RADAR pulse; and
the second spacing is longer than the first spacing.

The range identifier may be configured to identify the desired range based on at least one of an observed range of a display configured to display a first target detected in the observed range, a target range determined based on a previously detected distance of a second target, and an input range based on an input by a user.

If the range identifier identifies the desired range based on at least two of the observed range, the target range, and the input range, the desired range may be the longest range of respective ones of the observed range, the detected range, and the input range.

If the apparatus is configured to identify the desired range based on the observed range and the target range, the apparatus may include a first discriminator configured to discriminate whether or not the target range extends beyond the first predetermined distance and the observed range does not extend beyond the first predetermined distance; first sector identifying means configured to identify a sector in which the second target is present; first sector monitoring means configured to monitor if the pulse train is emitted to the sector, wherein the pulse train generation control unit may be configured to control, if the target range extends beyond the first predetermined distance and the observed range does not extend beyond the first predetermined distance, the pulse train generation unit such that the pulse train includes the first longer transmission frame if the pulse train is emitted into the sector and such that the pulse train includes the shorter transmission frame and does not include the first longer transmission frame if the pulse train is emitted to outside the sector.

The deciding unit may be configured to decide if the desired range extends beyond a third predetermined distance larger than the first predetermined distance; and the control unit may be further configured to control the pulse train generation unit such that the pulse train includes a second longer transmission frame including a second longer RADAR pulse (C) if the desired range extends beyond the third predetermined distance and such that the pulse train does not include the second longer transmission frame if the desired range does not extend beyond the third predetermined distance, the duration of the second longer RADAR pulse is longer than the duration of the first longer RADAR pulse, and a second longer spacing between the second longer RADAR pulse and a respective subsequent RADAR pulse in the pulse train is longer than the first longer spacing.

If the apparatus is configured to identify the desired range based on the observed range and the target range the apparatus may include a second discriminator configured to discriminate whether or not the target range extends beyond the third predetermined distance and the observed range does not extend beyond the third predetermined distance; second sector identifying means configured to identify a sector in which the second target is present; second sector monitoring means configured to monitor if the pulse train is emitted to the sector, wherein the pulse train generation control unit may be configured to control, if the target range extends beyond the second predetermined distance and the observed range does not extend beyond the second predetermined distance, the pulse train generation unit such that the pulse train includes the second longer transmission frame if the pulse train is emitted into the sector and such that the pulse train includes at least one of the shorter transmission frame and the first longer transmission frame and does not include the second longer transmission frame if the pulse train is emitted to outside the sector.

Each of the RADAR pulses of at least one of the transmission frames may be encoded differently.

The apparatus may include the pulse train generation unit configured to generate the pulse train according to the control by the control unit.

At least one of the control unit and the pulse train generation unit may be configured such that the pulse train generation unit generates all the RADAR pulses of the pulse train with a same amplitude.

The apparatus may include a detection unit configured to detect a third target based on a respective echo return generated when a respective RADAR pulse of the pulse train is reflected from the third target; wherein the duration of at least one of the RADAR pulses of the pulse train and the spacing between the respective RADAR pulse and a subsequent RADAR pulse of the pulse train may be such that detection of the third target by the detection unit is enabled if the third target is at a distance within the desired range.

According to exemplary embodiments of the disclosure, at least one of the following technical effects may be provided:

reduced RADAR energy consumption in generation of pulses of RADAR;
reduced network load;
improved target detection;
adaptation to the needs of the user;
each of these effects while still fulfilling the requirements of IEC.

The kind of operation according to EP 1 839 071 B1 has a number of implications. For one, there is a data stream provided with virtually constant data rate for both operating modes. Data is always generated from the very nearest range out to at least 24 NM. This implies that a target can always be tracked, even if it is outside the instrumented range (e.g., the range displayed on a display such as a MFD, which is decided by the user). This is desired to meet IEC performance standards (IEC 62388). It also implies that slave machines can always be provided with suitable data for their selected range, even if the selected range does not match the master MFD's instrumented range. On the other hand, this also implies that in case no targets beyond the instrumented range are tracked and no slave MFD requires data in those ranges, data is constantly generated and transmitted, but not used. Furthermore, the PRF is limited mostly by the sample time of the long range pulse. This means that the PRF could be increased to transmit more energy to closer ranges if the long range sample time would not be desired.

According to exemplary embodiments, the apparatus is configured to generate an adaptive pulse train layout that does not use a fixed composition of pulses, but adapts to the current need of the user, in turn leading to improved target detection and reduced network load.

With the adaptive pulse scheme (transmission frame) layout according to exemplary embodiments of the apparatus, one or more parameters (e.g., type of pulse (short, medium, or long), number of pulses used, pulse length (pulse duration or pulse with), PRF, sample time (temporal spacing between each pulse), amplitude of each pulse, sequential order for the type and number of each pulse, and a sector of space through which the pulses will propagate) are adjusted or adapted to reduce the network load and the processing load. Additionally, due to the possible increase in PRF, more energy can be transmitted to targets of interest, so the probability of detection can be increased in most scenarios if consecutive sweeps are coherently integrated. There is a linear relation between the signal to noise ratio (SNR) and the number of pulses (sweeps) that can be coherently integrated. This means that an increased PRF will increase the SNR for any given target in the same way.

According to exemplary embodiments of the apparatus, one or more requirements on the area to be scanned such as tracked ARPA targets, connected slave MFDs and an off-centered MFD view, are known and the pulse train is adjusted or adapted according to the one or more requirements. These requirements can include the sector(s) of space through which the pulses will propagate, the distance to a target, the anticipated distance range for a tracked target, a distance ranged set for an area of interest, etc.

Embodiments of the apparatus are applicable to known RADAR system. For example, the RADAR systems can include a transmission chain where the pulses are generated by a waveform generator, and these pulses are mixed with a continuous wave signal in order to obtain a RADAR signal having the RADAR pulses. Via a duplexer, the RADAR signal is transmitted by transceivers via a directional antenna. The directional antenna is rotated to cover the whole area around the antenna with RADAR signals.

The echo return from objects (targets) in the detection range is received by the directional antenna as a received signal and the duplexer feeds the received signal into the reception path. The duplexer feeds the received signal to the reception path only if it does not transmit the RADAR signal. In the reception path, the received signal is evaluated. In particular, the distance to an object can be determined based on the run time of the echo return and/or a relative speed of the target can be determined based on the Doppler shift of the echo return. The result of the evaluation may be displayed on a display such as a MFD.

The detection path may be adjusted or adapted such that it detects a target in the respective range if the target has a sufficient reflection property (e.g. size, reflectivity for the RADAR pulses from the transceiver, shape, etc.).

Exemplary embodiments of the apparatus are applicable to the transmission chain. In particular, the apparatus according to exemplary embodiments of the apparatus may control the waveform generator such that it generates appropriate pulse trains. The apparatus may be integrated with the waveform generator or separated therefrom. In the following, several use cases employing some embodiments of the apparatus are described at greater detail. Namely, embodiments of the apparatus provide a control apparatus or control unit configured to make the waveform generator to generate waveforms such that the transmitted pulse train of RADAR pulses corresponds to those described for the respective use case.

Use Case 1: Single MFD Connected to Transceiver, No Targets Tracked, Centered View In this use case, a single display (e.g. MFD) is connected to the RADAR system. The RADAR system is also connected to an embodiment of the apparatus (which can include a range identifier and a control unit). The MFD's PPI view is centered and no targets are tracked. In this scenario, there is no need to transmit a third, long pulse for far away ranges, as this data would not be viewed unless the instrumented range of the MFD would be set accordingly. Table 1 indicates the number of pulses actually desired. A corresponding table can be set up for 48 NM transmission range.

TABLE 1

Single MFD, No target tracking, centered view pulse train requirements

| Instrumented Range | Short Pulse (<1 NM) | Medium Pulse (<6 NM) | Long Pulse (<24 NM) | Comment |
| --- | --- | --- | --- | --- |
| 0.25 NM | Yes | No | No | Increase PRF |
| 0.5 NM | Yes | No | No | Increase PRF |
| 0.75 NM | Yes | No | No | Increase PRF |
| 1.5 NM | Yes | Yes | No | Increase PRF |
| 3 NM | Yes | Yes | No | Increase PRF |
| 6 NM | Yes | Yes | No | Increase PRF |
| 12 NM | Yes | Yes | Yes | Reduce long pulse sample range |
| 24 NM | Yes | Yes | Yes | |

It is evident that for ranges less than 12 NM, transmission of the long pulse is not desired at all in this case. This means that the PRF can be increased significantly, as the long pulse sample time is the main limitation for the pulse train PRF. Use of embodiments of the apparatus, in accordance to the methods disclosed herein, can achieve the increase in PRF.

For example, a 24 NM pulse scheme (with maximum data sampled up to 30 NM for tracking) would allow a maximum PRF of 2 kHz. The same pulse scheme with the long pulse left out would allow for a maximum PRF of more than 10 kHz. With coherent integration applied, this would improve the signal to noise ratio by a factor of 5 (7 dB).

Also shown in Table 1 is a reduction of the spacing (sample range) after the long pulse in case the range to be covered (e.g. instrumented range of the MFD) is more than 6 NM but not more than 12 NM. That is, in this case, the same long pulse as in the case of an instrumented range of 24 NM is emitted, but the spacing after long pulse is reduced. This is another option to increase the PRF.

Use Case 2: Single MFD Connected to Transceiver, No Targets Tracked, Off-Centered View In this use case, a single display (e.g. MFD) is connected to a RADAR system. The RADAR system is also connected to an embodiment of the apparatus (which can include a range identifier and a control unit). The PPI view of the MFD is off-centered and no targets are tracked.

Figure 2:
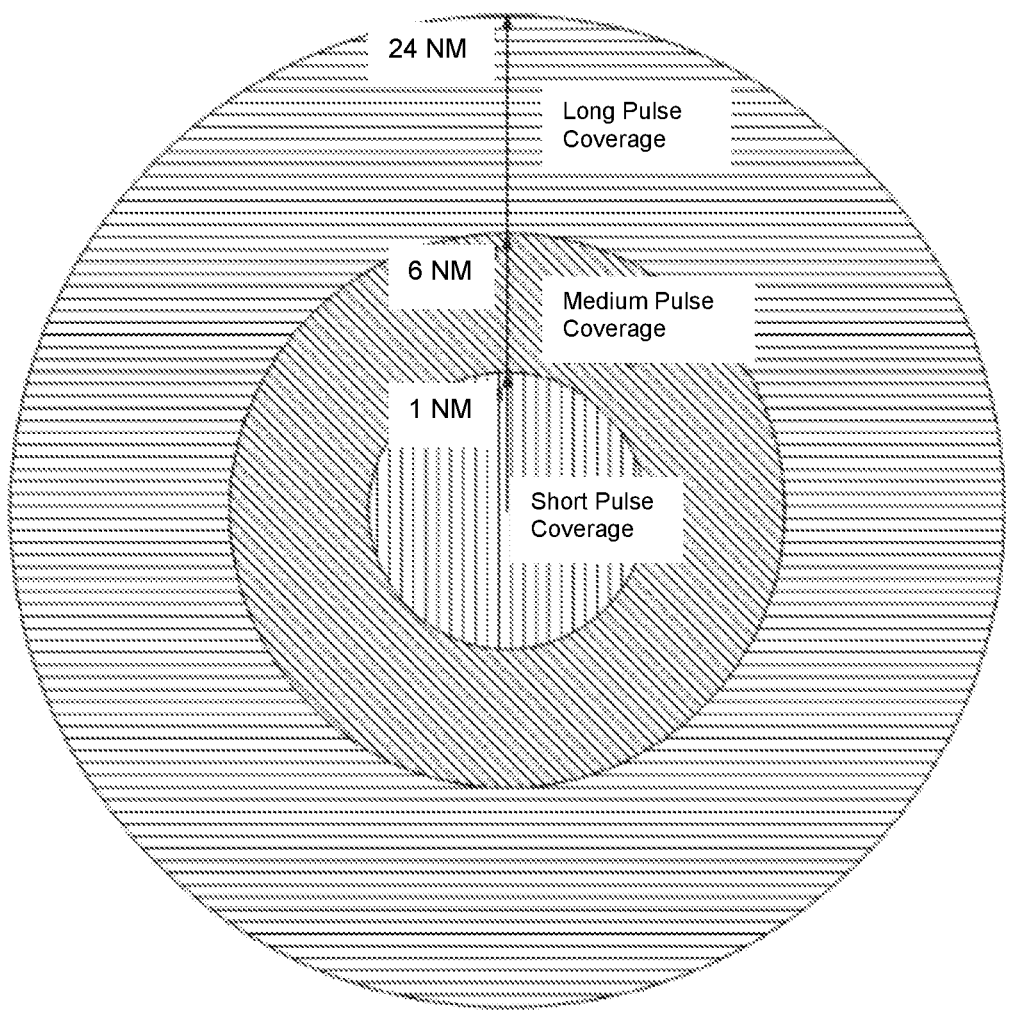
FIG. 2 shows a range coverage diagram for the known 3-Pulse Transmission Frame.
Figure 3:
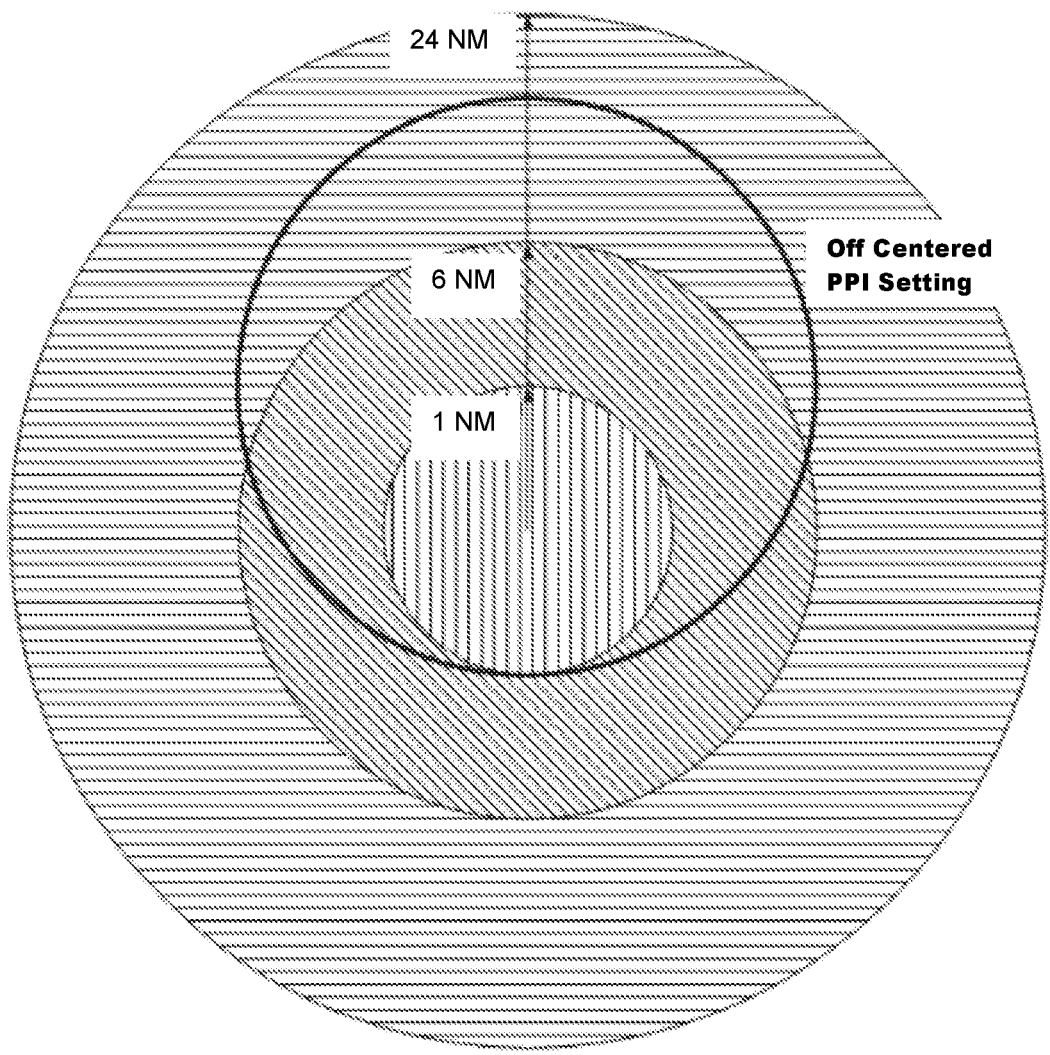
FIG. 3 shows a known range coverage diagram with an off-centered PPI view.

With the off-centered view, more data is desired in one direction than the instrumented range would suggest. On the other hand, on the opposite direction of the main view area, less data is desired. This is illustrated in FIG. 3 as an example. In FIG. 3, the bold circle indicates the off-centered PPI view overlaid on the different ranges for the RADAR scan shown in FIG. 2. In the forward direction (top of the figure), a range of more than 6 NM (and less than 24 NM) is displayed, while in the backward direction (bottom of the figure), only 1 NM is displayed. It is evident that data from the long pulse is desired for less than half of the picture to be displayed. Use of embodiments of the apparatus, in accordance to the methods disclosed herein, can more effectively and more efficiently adapt the pulse train for this scenario.

Figure 4:
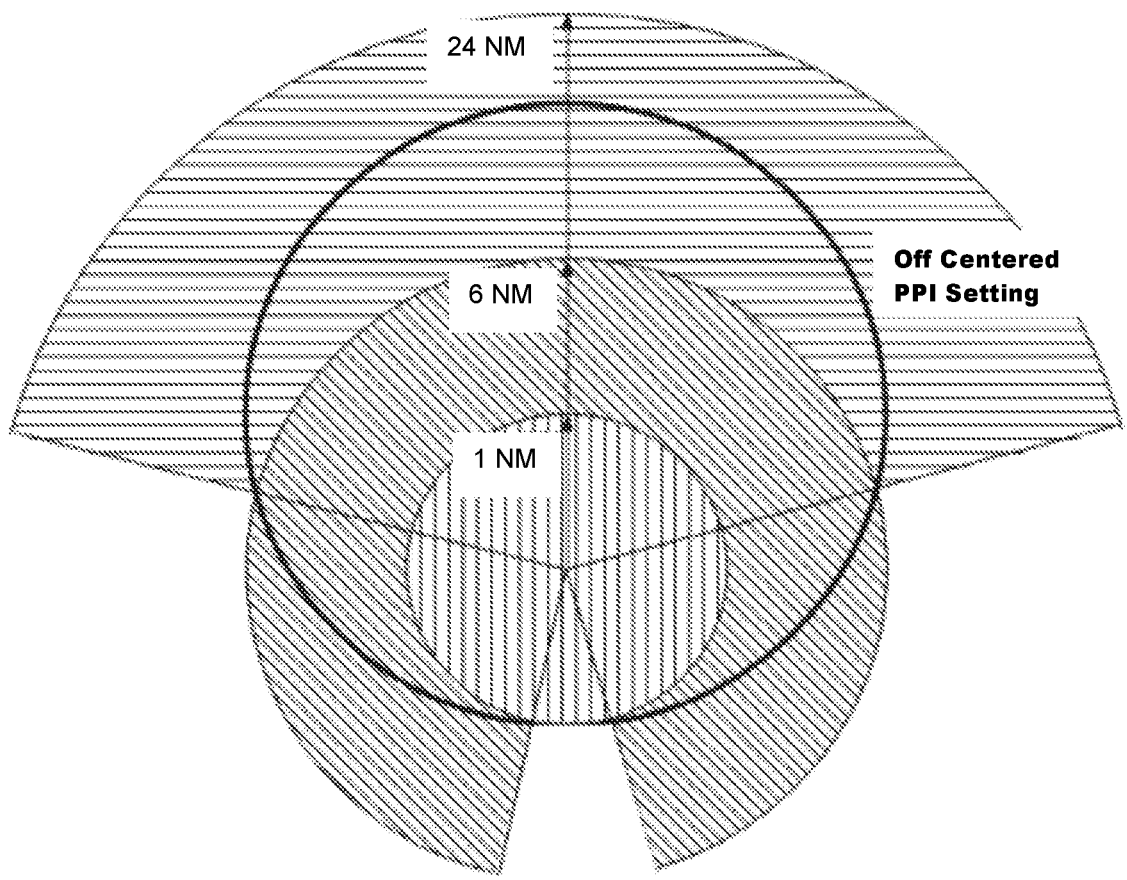
FIG. 4 shows a range coverage diagram with an off-centered PPI view according to an exemplary embodiment of a disclosed apparatus.

For example, FIG. 4 shows the range coverage diagram for the same off-centered view according to some embodiments of the apparatus. For illustration, the areas that do not need to be covered by the RADAR pulses have been removed. In this scenario, a long pulse is only transmitted in the direction where it is necessary (e.g., substantially in the forward direction, "ahead"). In the areas that just a short pulse (substantially the backward direction, "after") or a short pulse and a medium pulse (on the sides) is desired for coverage, the PRF could be increased to increase the number of integrated pulses and thus the probability of detection for any target of interest.

TABLE 2

Pulse train layout for the off-centered PPI view

| Direction | Short Pulse | Medium Pulse | Long Pulse | PRF |
|---|---|---|---|---|
| Ahead +/− 80° | Yes | Yes | Yes | Low |
| Both sides | Yes | Yes | No | Medium |
| After +/− 5° | Yes | No | No | High |

Table 2 shows an exemplary pulse train layout for the off-centered PPI view. In this example, the pulse train to be emitted depends on the direction (i.e., different pulse trains are emitted to different sectors—a sector being a region of space through which the pulses will propagate). Note that each of the pulse trains includes plural repetitions of the respective same transmission frame because the rotation of the antenna is much slower than the repletion frequency of the pulse train.

Although the PRF can be increased in the areas where only one or two pulses are desired, the network load would still be lower as compared with a fixed 3 pulse layout. This is due to the fact that the higher PRF is reduced during coherent integration, resulting in the same number of sweeps transmitted over the network. The reduced load is a result of the sweeps being shorter than before, as no data for longer ranges need to be transmitted.

In addition, the SNR relevant for target detection is still improved due to the higher amount of energy that has been transmitted to the targets.

Use Case 3: Single MFD Connected to Transceiver, Active Target Tracking, Centered View IEC requirements state that automatic target tracking may have to continue working even if the user changes the instrumented range. That means that the target tracker may have to be provided with data that might be outside the range visible to the user on the PPI.

With a static three pulse train according to the prior art, this is always possible, as a full range of data is constantly provided.

However, this requirement may not be fulfilled in the embodiments according to use cases 1 and 2. Thus, according to some embodiments of the apparatus, the RADAR transceiver is provided with information about the targets that are being tracked. Then, the area to be scanned by the RADAR pulses may be determined based on reasonable assumptions. For example, one may define an area of sufficient size around the target such that one can reasonably assume that the target will not move out of this area between two scans. The area may be predefined (e.g. a circle with a predefined radius around the target) or may depend on the speed of the target, as obtained from the Doppler effect or position of the target on two or more consecutive sweeps of the RADAR antenna, etc.

Figure 5:
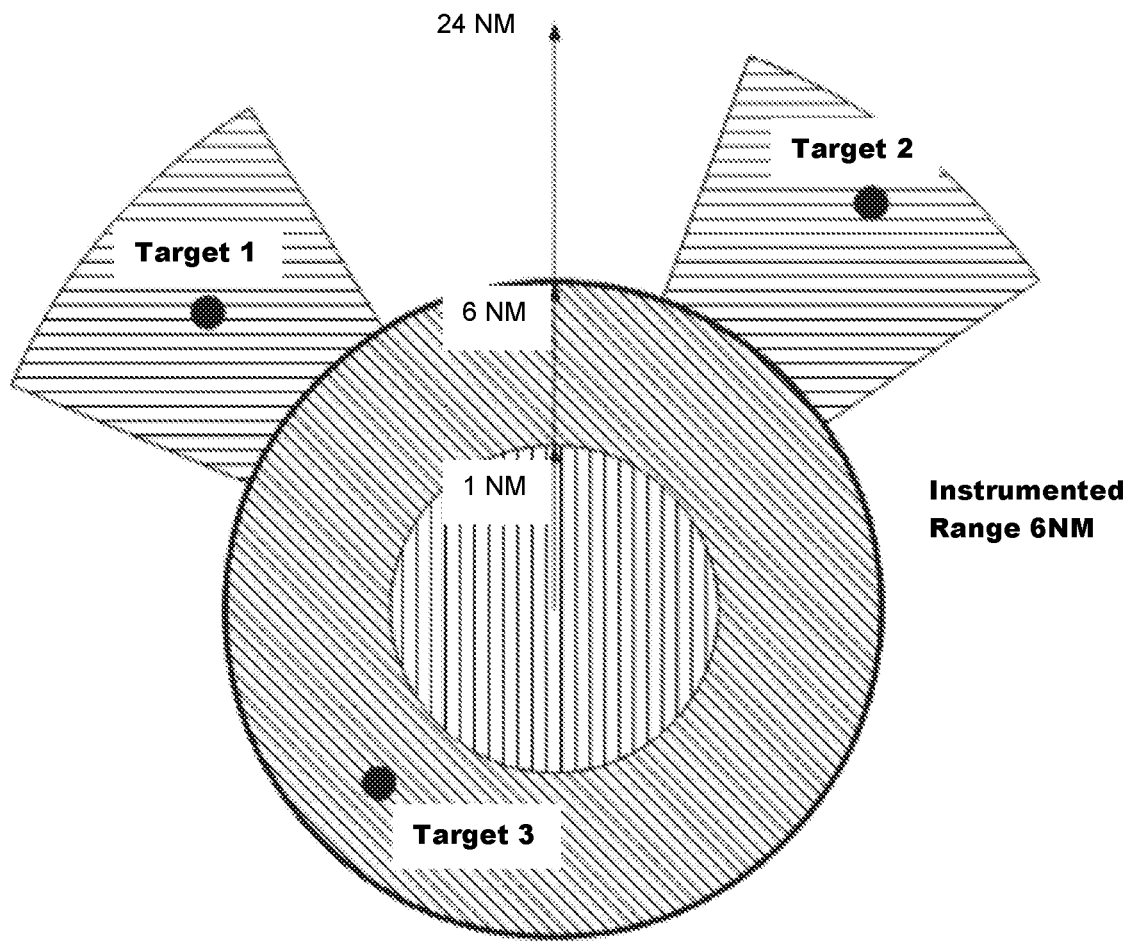
FIG. 5 shows a range coverage diagram with an instrumented range of 6 NM with 3 targets tracked according to an exemplary embodiment of a disclosed apparatus.

FIG. 5 shows an example range coverage diagram with an instrumented range of 6 NM. As described for use case 1, it would not be desired to transmit a long pulse with this range setting, as the PPI is not off-centered. However, in this case, 3 targets have been selected by the user for automatic target tracking. 2 of those targets are outside the instrumented range. Instead of activating the long pulse for the entire antenna revolution, according to some embodiments of the apparatus, the long pulse is transmitted only in the area where it is reasonable to assume the target may move. As the targets in the marine environment are moving relatively slow and do not change direction quickly, the desired additional transmit sectors for the long pulse could be kept narrow (e.g. 15°), which would enable the usage of a higher PRF in the remaining antenna revolution.

Table 3 shows a pulse train layout for the scenario of FIG. 5 according to some embodiments of the apparatus.

TABLE 3

Pulse train layout for the target tracking scenario
Use case 4: Single MFD Connected to Transceiver,
Target Tracking, Centered View

| Direction | Short Pulse | Medium Pulse | Long Pulse | PRF |
|---|---|---|---|---|
| Target 1 (+/− 7.5°) | Yes | Yes | Yes | Low |
| Target 2 (+/− 7.5°) | Yes | Yes | Yes | Low |
| Target 3 (+/− 7.5°) | Yes | Yes | No | Medium |
| All remaining | Yes | Yes | No | Medium |

According to exemplary embodiments of the apparatus, the control apparatus may control the pulse train generation unit such that only those ranges are covered by the RADAR pulses which are indeed desired. For instance, the display may be instrumented to observe the short range (by short pulses), and in addition, a target is to be tracked. If the target is in the long range outside the medium range, a transmission frame which is repeated in the pulse train may consist of a short pulse and a long pulse with respective spacings and may not include a medium pulse.

In this example, the user is "blind" in the medium range but energy is saved because the medium pulses are not emitted. Furthermore, the PRF may be increased and the SNR for the target tracking and in the short range may be increased.

In some of these embodiments, the long pulse may be emitted only into a sector around the target, similar to use case 3.

Figure 7:
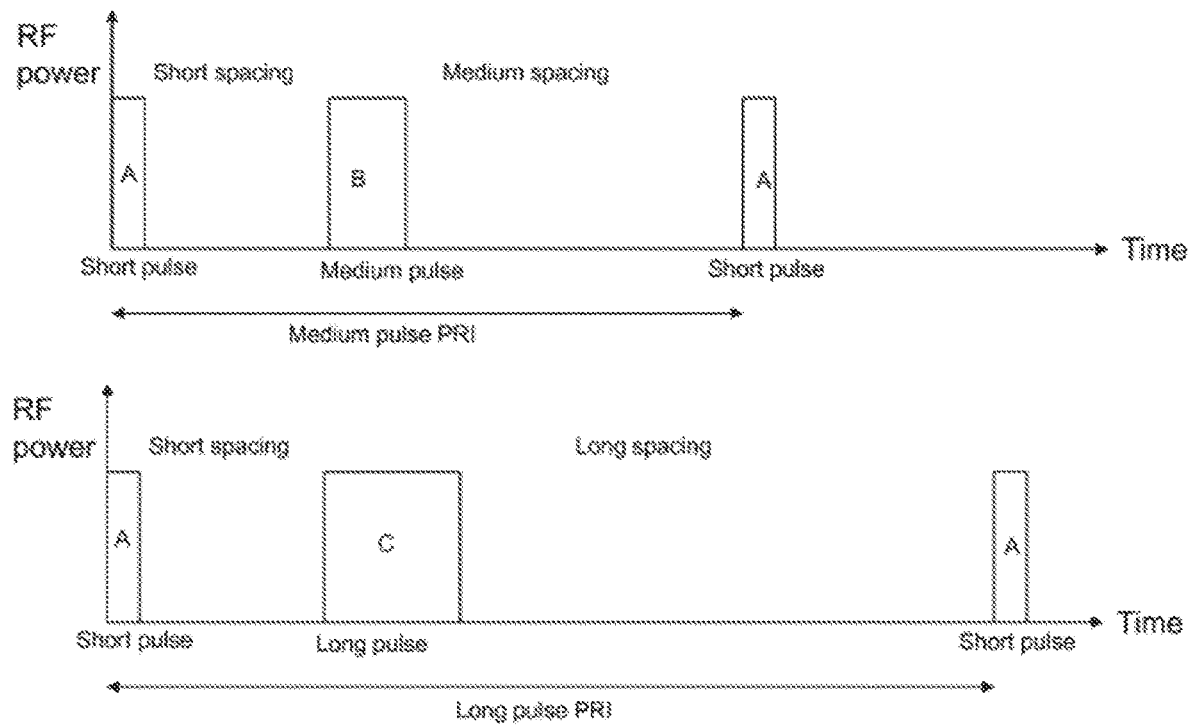
FIG. 7 shows exemplary transmission frames with short and medium pulses (top) and short and long pulses (bottom)

FIG. 7 compares two transmission frames according to some embodiments of the apparatus. In the top part, a transmission frame includes a short pulse and a medium pulse with respective spacings. In the bottom part, a transmission frame includes a short pulse and a long pulse with respective spacings. The PRI in the top part is shorter than the PRI in the bottom part. In some embodiments of the apparatus, the pulse train may include the transmission frames with short and medium pulses when emitted into certain sectors (e.g. without a target to be tracked), and the pulse train may include the transmission frames with short and long pulses when emitted into other sectors (e.g. around the target(s) to be tracked).

Figure 8:
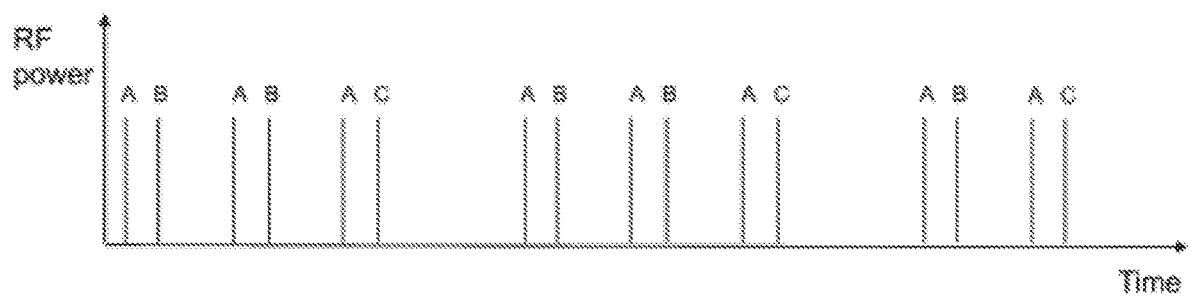
FIG. 8 shows an exemplary pulse train including the transmission frames of FIG. 7.

FIG. 8 shows an example, where transmission frames with short pulses A, long pulses C, and respective spacings are inserted only from time to time (when needed, e.g. to track a target) into the pulse train which otherwise includes transmission frames with short pulses A and medium pulses B. Note that FIG. 8 does not show the different widths of the pulses but only the different durations of the spacings.

Use Case 5: Target Tracking Only

According to exemplary embodiments of the disclosure, the control apparatus may control the pulse train generation unit such that only pulses desired to track a target are emitted. For example, if the target to be tracked is in the medium range outside the short range, only medium pulses may be emitted in each transmission frame. If the target to be tracked is in the long range outside the medium range, only long pulses may be emitted in each transmission frame. If the target is close to the border between two ranges and/or may likely cross the border (e.g. judged based on the location, the speed, and/or the movement direction of the target), pulses of two adjacent ranges may be emitted in each transmission frame. In some of these embodiments, the pulses are transmitted only into a sector around the target, similar to use case 3.

According to exemplary embodiments of the disclosure, the control apparatus may have to have information about the range that is desired to be scanned by the RADAR pulses. For example, the MFD may inform the control apparatus by a corresponding message. The message may be transmitted by the MFD on its own volition or on request from the control apparatus. There are other options to define the range to be scanned. For example, the range may be defined by a detected target. In this case, the range should preferably include some area around the location of the target. In this case, the target detector in the receive chain of the RADAR apparatus may inform the control apparatus on the location of the target. The message may be transmitted by the target detector on its own volition or on request from the control apparatus.

As a still further option, a user may input the range to be scanned. In some embodiments, these options may be combined, e.g. by logical OR or by logical AND. In particular, the control apparatus may instruct the RADAR apparatus to scan the largest range of the ranges indicated by the MFD, the target detector, and indicated by the user.

In some cases, not only a master MFD but a slave MFD is connected to the RADAR apparatus. The instrumented range of the master MFD may be used to determine the range desired to scan by the RADAR pulses. According to some embodiments of the apparatus, different strategies may be implemented to provide better data to the slave machine. For instance, if the instrumented range would be 6 NM on the master MFD, with no targets tracked and a centered view, the default operating mode is a two pulse transmission frame (see use case 1). If a longer range would be selected on the slave machine, the long pulse could be activated. This would mean a reduced PRF and thus a reduction in detectability on the master MFD. In some embodiments, the request from the slave MFD may be ignored. In some embodiments, slave MFDs may be distinguished by a new "privileged slave" category. If such a privileged slave requests data from a larger range, this request will be performed at the cost of worse data for the master MFD. In contrast, a standard slave machines (not privileged) is treated as a listener only, without influencing the desired range.

FIG. 6 illustrates the different pulses trains that are used in case the slave's instrumented range is taken into account by the transceiver. In this case, the larger of the two desired ranges is taken to determine the pulse layout. If the pulse train to be emitted depends on the sector to which the RADAR pulses are emitted, the control apparatus may need to know the sector (emission direction of the directional antenna). In some embodiments of the apparatus, the rotation of the antenna is independent from the generation of the pulse train. In these embodiments, the control apparatus is informed about the rotation position of the antenna, e.g. from a detection device that detects the actual rotation position of the antenna or from a control device which controls the rotation of the antenna. In some embodiments, the control apparatus according to some embodiments of the apparatus controls not only the generation of the pulse train but also the rotation of the antenna. In these embodiments, the control apparatus is anywhere aware of the rotation position of the antenna.

In the above described use cases, for example, a short pulse may have a length of 0.1 µs, a medium pulse may have a duration of 5 µs, and a long pulse may have a duration of 33 µs. Correspondingly, for example, a spacing after the short pulse may be 12 µs (for 1 NM), a spacing after the medium pulse may be 72 µs (for 6 NM), and a spacing after the long pulse may be 144 µs (for 12 NM) and 288 µs (for 24 SM), respectively. However, these values are given as example values only and may be adapted in particular according to the ranges to be covered by the RADAR signal.

Figure 9:
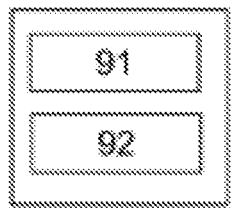
FIG. 9 shows a block diagram of an exemplary embodiment of a disclosed apparatus.

FIG. 9 shows a block diagram of an exemplary embodiment of the apparatus. The apparatus may be a control apparatus in order to control a RADAR apparatus, in particular a waveform generator thereof.

The apparatus can include a range identifier 91, and a control unit 92.

The range identifier 91 identifies a desired range, wherein the desired range is to be scanned by RADAR pulses of a pulse train. For example, the desired range may be identified based on an instrumented range of a display (such as a MFD), a distance to a target, or an input by a user.

The control unit 92 controls a pulse train generation unit (such as a waveform generator) to generate the pulse train such that
 the pulse train includes plural RADAR pulses;
 respective spacings are provided between the RADAR pulses of the pulse train.

The control unit is configured to adapt continuously at least one of a type, a number, and an order of the plural RADAR pulses and the spacings between the RADAR pulses generated by the pulse train generation unit according to the desired range.

The RADAR pulses of the pulse train may be arranged in transmission frames. The kinds of transmission frames may be predefined such that there are a limited number of different kinds of transmission frames (e.g. 2 or 3 or 4 different kinds of transmission frames). The transmission frames may be repeated plural times in the pulse train. There may be one or more kinds of transmission frames in the pulse train. Two transmission frames are of a same kind if the number, type, and order of the pulses and the spacings after the pulses are the same. Otherwise, the transmission frames are of a different kind.

The number of different pulse types and respective spacings may be, for example, two or three but it is not limited to these numbers. The control apparatus may be configured to cause the RADAR system to emit an arbitrary number of different pulse types. A pulse type is defined by at least one of its amplitude, length (width), and encoding. Two pulses are of the same pulse type if they have the same amplitude, width, and encoding. Otherwise, they are of different pulse types. Pulses A, B, and C described hereinabove are examples of different pulse types.

A transmission frame includes (e.g., consists of) an ordered sequence of pulses with respective spacings (e.g. AB, ABC, BC, etc.). A transmission frame may include plural pulses of the same type with respective spacings (e.g. A BA C A A B A A C B A). Compared to continuously repeating a transmission frame such as A B C in the pulse train, in the last example of a transmission frame, the amount of energy necessary to detect the targets surrounding the ship may be reduced and lesser data may be analyzed, because the unnecessary long range pulses, pulses (C), are left out from the pulse train such that they are not disturbing the analysis of the echo signals. Thus, there is less noise compared to the method of EP 1 839 071 B1. That is, the quality of the relevant information is improved with less pulse energy consumption.

In a pulse train, the transmission frames are emitted without an interruption between the transmission frames. The statement that a pulse is for a certain range (a short pulse (A) for a short range, a medium pulse (B) for a medium range, or a long pulse (C) for a long range) means that its energy and the spacing after the pulse are such that targets may be detected in the respective range without a blind sector where the pulse is still transmitted while echo returns out of the sector are received. For the short range pulse, this is only true beyond the blind sector caused by the transmission of the short pulse. On the other hand, reception of the echo returns of shorter ranges (e.g., of the short range for the medium pulse, or of the short range and the medium range for the long pulse) is at least partly encumbered because the medium and long pulse, respectively, is still transmitted when echo returns of the shorter ranges are received.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the apparatus provide, for example a control apparatus for a RADAR system, such as a marine RADAR system, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It will be understood that modifications to the embodiments disclosed herein can be made to meet a particular set of design criteria. Therefore, while certain exemplary embodiments of the apparatus and methods of using the same have been discussed and illustrated, it is to be distinctly understood that the apparatuses and methods are not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be appreciated by those skilled in the art that the apparatus can be embodied in other specific forms without departing from the spirit or essential characteristics thereof. The presently disclosed embodiments are therefore considered in all respects to be illustrative and not restricted. The scope of the apparatus and methods disclosed is indicated by the appended claims rather than the foregoing description and all changes that come within the meaning and range and equivalence thereof are intended to be embraced therein. Additionally, the disclosure of a range of values is a disclosure of every numerical value within that range, including the end points.

It should be noted that the description of the embodiments is given by way of example only and that various modifications may be made without departing from the scope of the apparatuses and methods as defined by the appended claims.

What is claimed is:

1. A RADAR control apparatus, comprising:
    a range identifier configured to identify a scan range, the scan range being a radial distance from the range identifier;
    a control unit configured to:
        receive rotation position information of a rotating directional antenna;
        control a pulse train generation unit to generate a pulse train, the pulse train arranged in at least one kind of transmission frame from a plurality of predefined kinds of transmission frames, wherein a first kind of transmission frame comprises a first type of pulse with a first pulse repetition frequency (PRF), and a second kind of transmission frame comprises a second type of pulse with a second pulse repetition frequency (PRF); and
        control emission of the generated pulse train based on the rotation position information and the scan range to emit a first pulse train arranged in the first kind of transmission frame to a first sector of the rotating directional antenna, and to emit a second pulse train arranged in the second kind of transmission frame to a second sector of the rotating directional antenna.

2. The RADAR control apparatus recited in claim 1, wherein:
    the control unit is further configured to:
    receive the scan range from the range identifier and cause a RADAR pulse train generation unit to emit a RADAR pulse train, the RADAR pulse train including RADAR pulse waves of a type of RADAR pulse wave and a temporal spacing between each pair of RADAR pulse waves; and
    continuously adapt the RADAR pulse train by adjusting the type of RADAR pulse wave and the temporal spacing between each RADAR pulse wave in accordance with the received scan range; and wherein:
the pattern of RADAR pulse waves will include any one or combination of: the type of RADAR pulse wave; a number of each type of RADAR pulse wave; a RADAR pulse wave duration or RADAR pulse wave width; a RADAR pulse wave amplitude; the temporal spacing between each RADAR pulse wave; a sequential order for the type and the number of RADAR pulse waves; or at least one sector of space surrounding the RADAR pulse generation unit through which the RADAR pulse waves will propagate; and
the type of RADAR pulse wave will include any one or combination of a short RADAR pulse wave width, a short RADAR pulse wave temporal spacing, a medium RADAR pulse wave width, a medium RADAR pulse wave temporal spacing, a long RADAR pulse wave width, or a long RADAR pulse wave temporal spacing.

3. The RADAR control apparatus recited in claim 2, wherein the control unit is configured to adapt the pattern of RADAR pulses by adjusting the number of each type of RADAR pulse wave.

4. The RADAR control apparatus recited in claim 2, wherein the control unit is configured to adapt the pattern of RADAR pulses by adjusting the RADAR pulse wave duration or RADAR pulse wave width.

5. The RADAR control apparatus recited in claim 2, wherein the control unit is configured to adapt the pattern of RADAR pulses by adjusting the RADAR pulse wave amplitude.

6. The RADAR control apparatus recited in claim 2, wherein the control unit is configured to adapt the pattern of RADAR pulses by adjusting the sequential order for the type of RADAR pulse waves.

7. The RADAR control apparatus recited in claim 2, wherein the control unit is configured to adapt the pattern of RADAR pulses by adjusting the sequential order for the number of RADAR pulse waves.

8. The RADAR control apparatus recited in claim 2, wherein the control unit is configured to adapt the pattern of RADAR pulses by adjusting the sector of space through which the RADAR pulse waves will propagate.

9. The RADAR control apparatus recited in claim 2, wherein the control unit is configured to adapt the pattern of RADAR pulses so that the RADAR pulse train has RADAR pulse waves with RADAR pulse wave widths and temporal spacings between each RADAR pulse wave to avoid a blind sector, the blind sector being formed by a distance within the scan range in which an echo RADAR pulse wave reflecting from a target cannot be received due to the RADAR pulse wave being emitted at a same time and space within the scan range.

10. The RADAR control apparatus recited in claim 2, wherein the at least one sector of space is a sectant of a 360 degree perimeter surrounding the RADAR pulse generation unit.

11. The RADAR control apparatus recited in claim 2, wherein:
the short RADAR pulse wave width will be designated for spanning a first distance;
the medium RADAR pulse wave width will be designated for spanning a second distance;
the long RADAR pulse wave width will be designated for spanning a third distance; and
the first distance is less than the second distance, and the second distance is less than the third distance.

12. The RADAR control apparatus recited in claim 11, wherein:
the first distance includes distances within a range from greater than 0 nautical miles to 1 nautical mile;
the second distance includes distances within a range from greater than 1 nautical mile to 6 nautical miles; and
the third distance includes distances within a range from greater than 6 nautical miles and less than 24 nautical miles.

13. The RADAR control apparatus recited in claim 2, comprising:
a deciding unit configured to compare a predetermined distance with the scan range and determine when the scan range will be greater than or less than the predetermined distance;
wherein:
the control unit is configured to cause the pulse generation unit to generate at least one transmission frame as part of the RADAR pulse train, each transmission frame including at least two RADAR pulse waves and a temporal spacing for each RADAR pulse wave;
when the scan range will be less than or equal to the predetermined distance the control unit is configured to cause the pulse generation unit to generate a first transmission frame;
when the scan range will be greater than the predetermined distance, the control unit is configured to cause the pulse generation unit to generate a second transmission frame; and
the RADAR pulse wave widths and temporal spacings for the first transmission frame are less than the RADAR pulse wave widths and temporal spacings for the second transmission frame.

14. The RADAR control apparatus recited in claim 13, wherein when the scan range will be greater than the predetermined distance, the control unit is configured to cause the pulse generation unit to generate the first transmission frame and the second transmission frame.

15. The RADAR control apparatus recited in claim 13, wherein when the scan range will be less than or equal to the predetermined distance, the control unit is configured to cause the pulse generation unit to generate the first transmission frame and to not generate the second transmission frame.

16. The RADAR control apparatus recited in claim 1, wherein the range identifier identifies the scan range via at least one of the following:
a distance to a target determined by a ranging technique, the determined distance being a target range;
an observed distance to a target obtained from a display, the observed distance being an observed range; or
a distance manually entered via a user, the entered distance being an input range; and
wherein the scan range will be set to the longest of the target range, the observed range, or the input range.

17. A RADAR system, comprising:
a rotating directional antenna for transmitting radar signals comprising radar pulses;
a RADAR pulse generation unit configured to emit RADAR pulse waves;
a range identifier configured to identify a scan range for the RADAR pulse generation unit, the scan range being a radial distance from the RADAR pulse generation unit; and a control unit configured to:
receive rotation position information of the rotating directional antenna;
control a pulse train generation unit to generate a pulse train, the pulse train arranged in at least one kind of transmission frame from a plurality of predefined kinds of transmission frames, wherein a first kind of transmission frame comprises a first type of pulse with a first pulse repetition frequency (PRF), and a second kind of transmission frame comprises a second type of pulse with a second pulse repetition frequency (PRF); and
control emission of the generated pulse train based on the rotation position information and the scan range to emit a first pulse train arranged in the first kind of transmission frame to a first sector of the rotating directional antenna, and to emit a second pulse train arranged in the second kind of transmission frame to a second sector of the rotating directional antenna.

18. A method for generating RADAR pulse waves, the method comprising:
identifying a scan range within a 360 degree perimeter;
receiving rotation position information of a rotating directional antenna;
controlling a pulse train generation unit to generate a pulse train, the pulse train arranged in at least one kind of transmission frame from a plurality of predefined kinds of transmission frames, wherein a first kind of transmission frame comprises a first type of pulse with a first pulse repetition frequency (PRF), and a second kind of transmission frame comprises a second type of pulse with a second pulse repetition frequency (PRF); and
controlling emission of the generated pulse train based on the rotation position information and the scan range to emit a first pulse train arranged in the first kind of transmission frame to a first sector of the rotating directional antenna, and to emit a second pulse train arranged in the second kind of transmission frame to a second sector of the rotating directional antenna.

19. The method for generating RADAR pulse waves recited in claim 18, further comprising:
receiving the scan range from the range identifier and cause a RADAR pulse train generation unit to emit a RADAR pulse train, the RADAR pulse train including RADAR pulse waves of a type of RADAR pulse wave and a temporal spacing between each pair of RADAR pulse waves; and
continuously adapting the RADAR pulse train by adjusting the type of RADAR pulse wave and the temporal spacing between each RADAR pulse wave in accordance with the received scan range;
wherein:
the pattern of RADAR pulse waves will include a combination of: the type of RADAR pulse wave; a number of each type of RADAR pulse wave; a RADAR pulse wave duration or RADAR pulse wave width; a RADAR pulse wave amplitude; the temporal spacing between each RADAR pulse wave; a sequential order for the type and the number of RADAR pulse waves; or at least one sector of space through which the RADAR pulse waves will propagate; and
the type of RADAR pulse wave will include any one or combination of a short RADAR pulse wave width, a short RADAR pulse wave temporal spacing, a medium RADAR pulse wave width, a medium RADAR pulse wave temporal spacing, a long RADAR pulse wave width, or a long RADAR pulse wave temporal spacing.

20. The method for generating RADAR pulse waves recited in claim 18, comprising:
receiving an echo RADAR pulse wave reflected from a target;
wherein the RADAR pulse train has RADAR pulse waves with RADAR pulse wave widths and temporal spacings between each RADAR pulse wave so that the echo RADAR pulse will be received when the target will be within the scan range; and
wherein the RADAR pulse train has RADAR pulse waves with RADAR pulse wave widths and temporal spacings between each RADAR pulse wave so that the scan range has no blind sector, the blind sector being formed by a distance within the scan range in which the target cannot be detected because the echo RADAR pulse wave will not be received due to the RADAR pulse wave being emitted at a same time and space within the scan range.

21. The method for generating RADAR pulse waves recited in claim 18, wherein generating the pattern of RADAR pulse waves will include limiting the type of RADAR pulse wave to a sector of space of the 360 degree perimeter.

* * * * *